(12) United States Patent
Ha

(10) Patent No.: US 7,295,245 B2
(45) Date of Patent: Nov. 13, 2007

(54) METHOD AND APPARATUS FOR CONVERTING FRAME RATE USING TIME SHIFTING AND MOTION COMPENSATION

(75) Inventor: Tae-hyeun Ha, Seoul (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 570 days.

(21) Appl. No.: 10/901,968

(22) Filed: Jul. 30, 2004

(65) Prior Publication Data

US 2005/0078212 A1    Apr. 14, 2005

(30) Foreign Application Priority Data

Oct. 14, 2003    (KR)    .................... 10-2003-0071431

(51) Int. Cl.
*H04N 7/01*    (2006.01)
(52) U.S. Cl. ..................................... 348/452
(58) Field of Classification Search ........ 348/410–416, 348/699, 700; 375/240.16
See application file for complete search history.

(56) References Cited

U.S. PATENT DOCUMENTS

| 4,727,422 | A | * | 2/1988 | Hinman ................ 375/240.12 |
| 5,457,497 | A | * | 10/1995 | Thomas ................ 375/240.21 |
| 5,610,662 | A | * | 3/1997 | Hackett ................ 348/452 |
| 5,682,205 | A | * | 10/1997 | Sezan et al. ............ 348/452 |
| 5,754,246 | A | * | 5/1998 | Flannaghan ............ 348/459 |
| 5,929,919 | A | * | 7/1999 | De Haan et al. ........ 348/452 |
| 6,407,775 | B1 | | 6/2002 | Frink et al. |
| 6,621,864 | B1 | * | 9/2003 | Choo ................ 375/240.16 |
| 7,020,199 | B2 | * | 3/2006 | Penain et al. .......... 375/240.16 |
| 7,158,186 | B2 | * | 1/2007 | Selby et al. ............ 348/459 |

FOREIGN PATENT DOCUMENTS

| EP | 1 006 723 | 6/2000 |
| JP | 10-117355 | 5/1998 |
| JP | 2002-271797 | 9/2002 |
| KR | 1999-49348 | 7/1999 |

OTHER PUBLICATIONS

Notice to Submit Response issued by the Korean Industrial Property Office on Jul. 29, 2005 in Korean Application No. 10-2003-0071431.

* cited by examiner

*Primary Examiner*—Paulos M. Natnael
(74) *Attorney, Agent, or Firm*—Staas & Halsey LLP

(57) ABSTRACT

A method of and an apparatus for converting a frame rate using time shifting and motion compensation. The frame rate converting method includes calculating an average motion vector magnitude between every two adjacent frames among a predetermined number of frames input in series determining a frame section corresponding to a maximum value among the average motion vector magnitudes calculated every two adjacent frames and generating a new frame by performing motion compensation, to which a predetermined proportion is applied, in the frame section having the maximum motion vector.

14 Claims, 4 Drawing Sheets

METHOD AND APPARATUS FOR CONVERTING FRAME RATE USING TIME SHIFTING AND MOTION COMPENSATION

CROSS-REFERENCE TO RELATED APPLICATIONS

This application claims the priority of Korean Patent Application No. 2003-71431, filed on Oct. 14, 2003 in the Korean Intellectual Property Office, the disclosure of which is incorporated herein in its entirety by reference.

BACKGROUND OF THE INVENTION

1. Field of the Invention

The present invention relates to an image signal converting apparatus and method, and more particularly, to a method of and an apparatus for converting a frame rate using time shifting and motion compensation.

2. Description of the Related Art

Commonly, a frame, which is one image picture, is made up of minimum picture elements, each picture element called a pixel. Resolution is determined according to the number of pixels included in the frame. A frame having a maximum resolution of 1,920×1,080 is 1,920 pixels wide and 1,080 pixels long. A frame rate is the number of frames transmitted per second. When an image signal such as a TV signal is transmitted, an appropriate number of frames per second are transmitted on the basis of the eyesight characteristics of a human body.

A frame rate of a film image signal produced for showing a movie is commonly 24 frames per second (fps). However, a frame rate of an National Television System Committee (NTSC) standard image signal is 30 fps. Therefore, the frame rate of the film image signal must be expanded into 30 fps (60 fields per second) for applying to an NTSC standard format.

FIG. 1 illustrates a conventional frame rate converting method suitable for converting a 24 fps digital image signal into a 30 fps digital image signal.

Referring to, FIG. 1, each of 24 input frames F1, F2, F3, F4, . . . , F24 is divided into a top field f1 and a bottom field f2. New frames F1, F2, F3', F4', F5 . . . , F30 are generated using the top fields f1 and the bottom fields f2 of the 24 input frames F1, F2, F3, F4, . . . , F24. That is, the new frame F3' is generated from the top field f1 of the frame F2 and the bottom field f2 of the frame F3, and the new frame F4' is generated from the top field f1 of the frame F3 and the bottom field f2 of the frame F4.

Likewise, if new frames are generated from adjacent frames where autocorrelation is high, 24 frames are converted into 30 frames.

The conventional frame rate converting method used to convert a frame rate using cross type field repetition generates discontinuity in a picture (commonly, called a motion judder effect) due to simple field repetition. For example, if there is an object flying from the right to the left in a picture, the motion of the object is inconveniently displayed due to discontinuous portions.

SUMMARY OF THE INVENTION

According to an aspect of the present invention, a frame rate converting method suitable to minimize a motion judder effect due to simple frame repetition by converting a frame rate using time shifting and motion compensation and an apparatus therefor are provided.

According to an aspect of the present invention, there is provided a frame rate converting method including calculating an average motion vector magnitude between every two adjacent frames among a predetermined number of input frames, determining a frame section corresponding to a maximum value among the average motion vector magnitudes calculated between every two adjacent frames, and generating a new frame by performing motion compensation, to which a predetermined proportion is applied, in the frame section having the maximum motion vector.

According to another aspect of the present invention, there is provided a frame rate converting apparatus including a frame buffer, which stores a predetermined number of frames of an input video stream; a maximum motion vector determining unit, which measures an average motion vector magnitude between every two consecutive frames stored in the frame buffer and determines a section having a maximum motion vector among the average motion vectors; a frame interpolator, which interpolates by generating a new frame on the basis of motion compensation of a predetermined proportion in the frame section having the maximum motion vector determined by the maximum motion vector determining unit; and a timing controller, which generates a timing control signal for sequentially re-combining the frame interpolated by the frame interpolator and the frames stored in the frame buffer with reference to the maximum motion vector frame section determined by the maximum motion vector determining unit.

Additional aspects and/or advantages of the invention will be set forth in part in the description which follows and, in part, will be obvious from the description, or may be learned by practice of the invention.

BRIEF DESCRIPTION OF THE DRAWINGS

The above and/or other aspects and advantages of the present invention will become more apparent by describing in detail exemplary embodiments thereof with reference to the attached drawings of which.

DETAILED DESCRIPTION OF THE EMBODIMENTS

Figure 1:
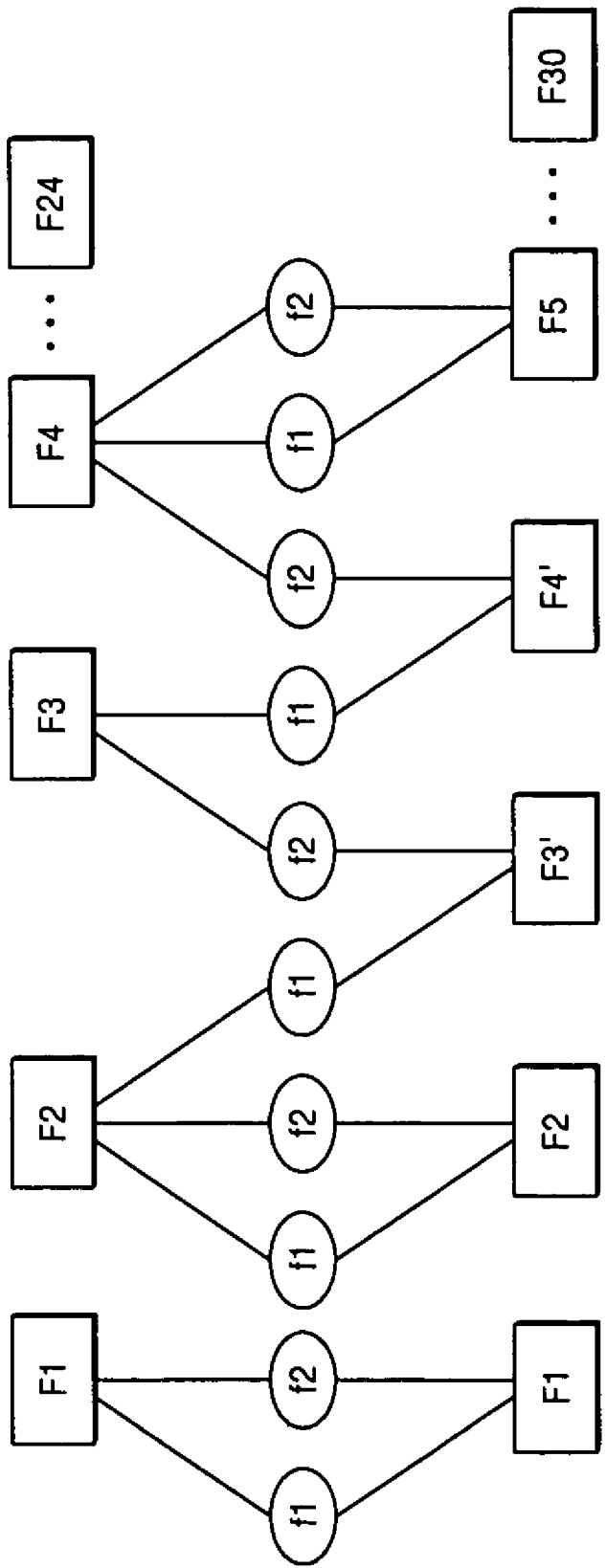
FIG. 1 illustrates a conventional frame rate converting method suitable for converting a 24 fps digital image signal into a 30 fps digital image signal.

Reference will now be made in detail to the embodiments of the present invention, examples of which are illustrated in the accompanying drawings, wherein like reference numerals refer to the like elements throughout. The embodiments are described below to explain the present invention by referring to the figures.

Figure 2:
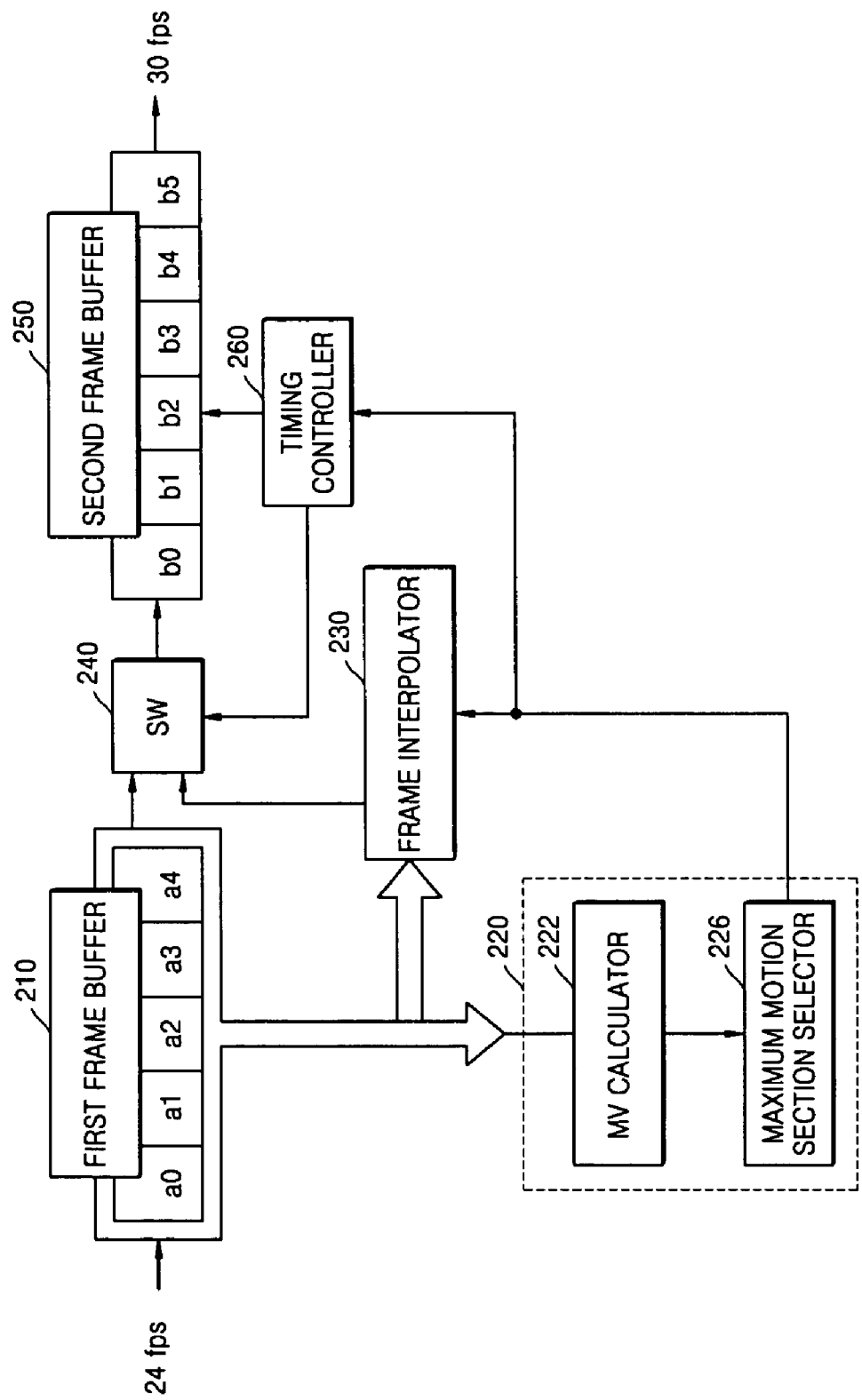
FIG. 2 is a block diagram of a frame rate converting apparatus according to an exemplary embodiment of the present invention.

FIG. 2 is a block diagram of a frame rate converting apparatus according to an exemplary embodiment of the present invention. Referring to FIG. 2, a first frame buffer 210 stores a video stream input at a 24 fps rate in 5 frame units a0, a1, a2, a3, and a4.

A maximum motion vector determining unit 220 includes a motion vector calculator 222 and a maximum motion section selector 226. The maximum motion vector determining unit 220 calculates an average motion vector magnitude between every two consecutive frames stored in the first frame buffer 210 and determines a section having a maximum motion vector among the average motion vectors. That is, the motion vector calculator 222 calculates the average motion vector magnitude between every two adjacent frames among the 5 frames. The maximum motion section selector 226 compares average motion vector magnitudes calculated between every two adjacent frames and selects the frame section having the maximum motion vector.

A frame interpolator 230 generates an interpolation frame by applying a predetermined motion compensation proportion between frames received from the first frame buffer 210 on the basis of the frame section having the maximum motion vector determined by the maximum motion vector determining unit 220. For example, if the maximum motion vector is between the frame a1 and the frame a2, the frame interpolator 230 combines a first frame generated by performing motion compensation of the frame a1 by half a motion vector in a direction from the frame a1 to the frame a2 and a second frame generated by performing motion compensation of the frame a2 by half a motion vector in a direction from the frame a2 to the frame a1. At this time, the combined frame, obtained by combining the first and second frames, is inserted as a new frame between a frame b1 and a frame b3.

A switch unit 240 sequentially combines the new frame generated by the frame interpolator 230 and the 5 frames input from the first frame buffer 210 according to a timing control signal from a timing controller 260.

A second frame buffer 250 stores the six frames combined by the switch unit 240 as b0, b1, b2, b3, b4, and b5 according to the timing control signal.

The timing controller 260 generates the timing control signal and provides the timing control signal to the switch unit 240 so that the frames are sequentially combined with reference to the maximum motion vector section determined by the maximum motion vector determining unit 220. Also, the timing controller 260 generates the timing control signal so that the frames b0 through b5 stored in the second frame buffer 250 are output at a frame rate of 30 fps. At this time, the timing controller 260 performs time shifting so that the frames b0 through b5 stored in the second frame buffer 250 are output with a constant period.

Figure 3:
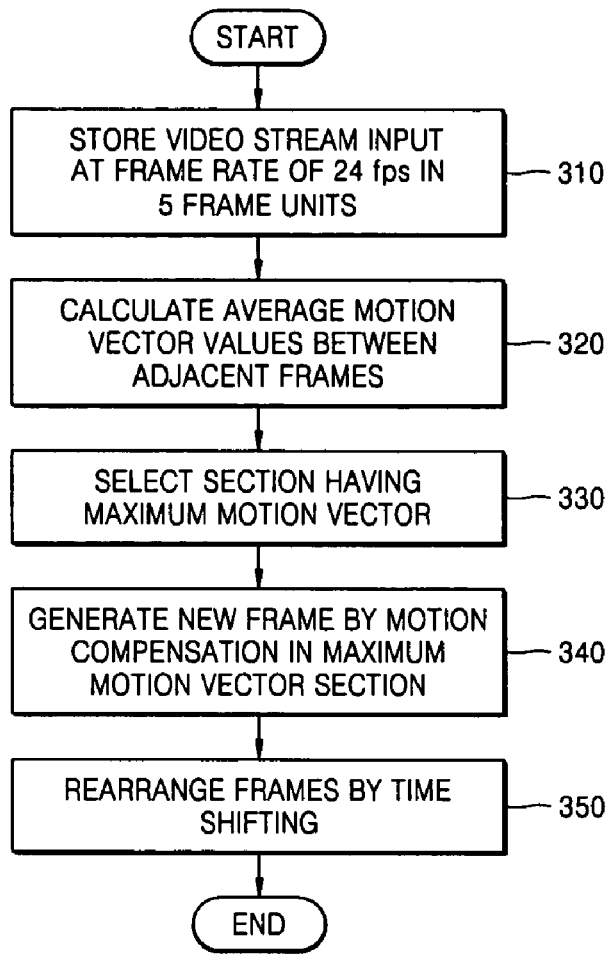
FIG. 3 is a flowchart of a frame rate converting method according to an exemplary embodiment of the present invention.

FIG. 3 is a flowchart of a frame rate converting method according to an exemplary embodiment of the present invention.

Five frames of a video stream input at a rate of 24 fps are stored as a0, a1, a2, a3, and a4 in operation 310 in the first frame buffer 210.

Figure 4A:
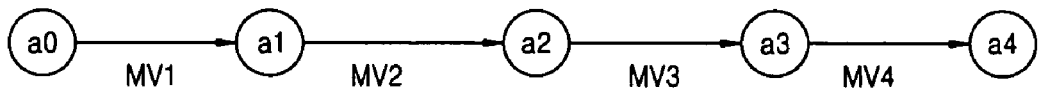
FIGS. 4A through 4C are concept diagrams for illustrating the flowchart of FIG. 3.

Average motion vector magnitudes between each two adjacent frames among the 5 consecutively input frames are calculated in operation 320 by the maximum motion vector determining unit 220. For example, as shown in FIG. 4a, MV1 is the average motion vector magnitude between the frame a0 and the frame a1, MV2 is the average motion vector magnitude between the frame a1 and the frame a2, MV3 is the average motion vector magnitude between the frame a2 and the frame a3, and MV4 is the average motion vector magnitude between the frame a3 and the frame a4.

When the average motion vector magnitudes of the frame sections are MV1 through MV4, a section having a maximum average motion vector magnitude (MMV) is selected using Equation 1 in operation 330.

$$MMV = \text{Max}(MV1, MV2, MV3, MV4) \qquad \text{Equation 1}$$

Figure 4B:
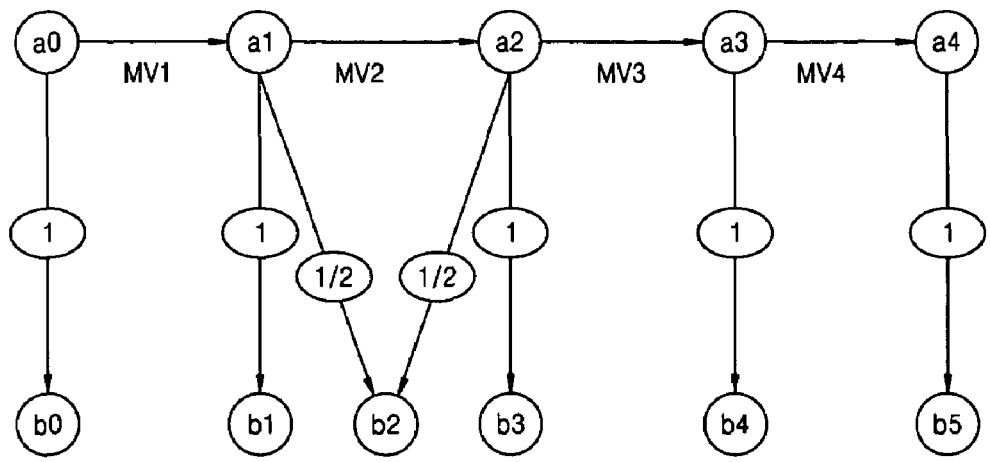

In operation 340, a new interpolation frame is generated by applying motion compensation to the frame section in which the average motion vector magnitude is maximum. Referring to FIG. 4B, a frame interpolation process is described in detail. If MV2 is the frame section having a maximum value, new frames b0, b1, b3, b4, and b5 are generated by simply duplicating existing frames a0, a1, a2, a3, and a4. Applying a predetermined motion compensation proportion to the existing frames a1 and a2 generates a new frame b2. That is, a first frame which is generated by performing motion compensation of the frame a1 by half a motion vector in a direction from the frame a1 to the frame a2, and a second frame, which is generated by performing motion compensation of the frame a2 by half a motion vector in a direction from the frame a2 to the frame a1 are combined. At this time, the combined frame is inserted as a new frame b2 between the frame b1 and the frame b3.

Figure 4C:
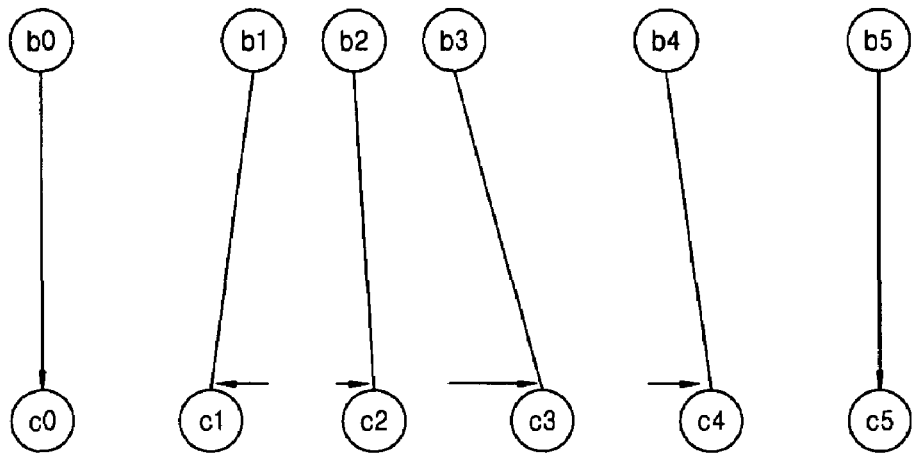

The intervals of the newly generated frames b0 through b5 are temporally irregular as shown in FIG. 4C.

Therefore, rearranged frames c0 through c5 are formed by duplicating the frames b0 and b5 as they are and performing time shifting for the other frames b1 through b4 in operation 350. For example, the intervals are made regular by delaying or advancing the frames b1 through b4 by predetermined times according to the timing controller 260 in the directions marked by arrows as shown in FIG. 4C.

Thus, the video stream input at the 24 fps rate is converted into a video stream with a 30 fps rate by applying the time shifting and the motion compensation according to an embodiment of the present invention.

This invention can also be embodied as computer readable codes on a computer readable recording medium. The computer readable recording medium is any data storage device that can store data, which can be thereafter read by a computer system. Examples of the computer readable recording medium include read-only memory (ROM), random-access memory (RAM), CD-ROMs, magnetic tapes, hard disks, floppy disks, flash memories, optical data storage devices, and carrier waves (such as data transmission through the Internet). The computer readable recording medium can also be distributed over network coupled computer systems so that the computer readable code is stored and executed in a distributed fashion.

As described above, according to embodiments of the present invention, an artifact due to motion compensation is reduced by using motion compensation at the minimum, and visual motion judder is reduced by generating a new frame by performing motion compensation in a section in which a motion vector is maximum.

Although a few embodiments of the present invention have been shown and described, it would be appreciated by those skilled in the art that changes may be made in these embodiments without departing from the principles and spirit of the invention, the scope of which is defined in the claims and their equivalents.

What is claimed is:

1. A frame rate converting method, comprising:
    calculating an average motion vector magnitude between every two adjacent frames among a predetermined number of input frames;

determining a frame section within the two adjacent frames corresponding to a maximum value among the average motion vector magnitudes calculated between every two adjacent frames; and generating a new frame by performing motion compensation, to which a predetermined proportion is applied, in the frame section having the maximum motion vector, wherein generating the new frame comprises:

calculating a motion vector between the two adjacent frames of the frame section; and combining a first frame generated by performing motion compensation of one of the two adjacent frames by half a motion vector in a direction towards the other of the two adjacent frames and a second frame generated by performing motion compensation of the other of the two adjacent frames by half a motion vector in a direction towards the one of the two adjacent frames.

2. The method of claim 1, further comprising:

performing time shifting of at least one of the predetermined number of frames and the new frame to form regular intervals.

3. A frame rate converting apparatus, comprising:

a frame buffer which stores a predetermined number of frames of an input video stream;

a maximum motion vector determining unit which measures an average motion vector magnitude between every two consecutive frames stored in the frame buffer and determines a frame section having a maximum motion vector magnitude among the average motion vector magnitudes;

a frame interpolator which interpolates by generating a new frame on the basis of motion compensation of a predetermined proportion in the frame section having the maximum motion vector determined by the maximum motion vector determining unit; and a timing controller which generates a timing control signal for sequentially combining the new frame interpolated by the frame interpolator and the frames stored in the frame buffer with reference to the maximum motion vector frame section determined by the maximum motion vector determining unit.

4. The apparatus of claim 3, wherein the maximum motion vector determining unit comprises:

a motion vector calculator which calculates the average motion vector magnitude between every two adjacent frames among the predetermined number of frames; and a maximum motion section selector which compares the average motion vector magnitudes calculated by the motion vector calculator between every two adjacent frames and determines the frame section having the maximum motion vector.

5. The apparatus of claim 3, wherein the frame interpolator combines a first frame generated by performing motion compensation of one of the two adjacent frames in the frame section by half a motion vector in a direction toward the other of the two adjacent second frames in the frame section and a second frame generated by performing motion compensation of the other of the two adjacent frames by half a motion vector in a direction toward the one of the two adjacent frames.

6. The apparatus of claim 3, further comprising:

an output frame buffer which sequentially stores the combined new frame and the frames stored in the frame buffer according to the timing control signal generated by the timing controller.

7. A frame rate converter, comprising:

an input buffer which stores frames at a first frame rate;

a motion vector determiner which calculates an average motion vector value between adjacent frames in the input buffer;

a frame interpolator which generates a new frame based on the adjacent frames having a maximum average motion vector value; and a controller which sequentially forms the frames and places the new frame between the adjacent frames having the maximum average motion vector value, wherein the sequentially formed frames and the new frame have a second frame rate, wherein the frame interpolator generates the new frame by combining one frame of the adjacent frames having the maximum average motion vector value, and the other frame of the adjacent frames having the maximum average motion vector value according to motion compensation by a predetermined proportion, and the motion compensation comprises compensating the one frame of the adjacent frames by half a motion vector toward the other of the adjacent frames and compensating the other frame of the adjacent frames by the half of the motion vector toward the one of the adjacent frames.

8. A frame rate converter, comprising:

an input buffer which stores frames at a first frame rate;

a motion vector determiner which calculates an average motion vector value between adjacent frames in the input buffer;

a frame interpolator which generates a new frame based on the adjacent frames having a maximum average motion vector value;

a controller which sequentially forms the frames and places the new frame between the adjacent frames having the maximum average motion vector value, wherein the sequentially formed frames and the new frame have a second frame rate;

an output buffer which stores the sequentially formed frames and the new frame according to the controller; and a switch which directs the frames and the new frame from the input buffer and the frame interpolator, respectively, to the output buffer according to the controller, wherein the frames and the new frame are sequentially formed.

9. The converter of claim 8, wherein the controller time shifts the sequentially formed frames and the new frame such that an interval between each frame is constant.

10. The converter of claim 7, wherein the first frame rate is 24 frames per second and the second frame rate is 30 frames per second.

11. A method of converting between a first frame rate and a second frame rate, comprising:

receiving frames of a video stream at a first frame rate;

calculating an average motion vector magnitude between each pair of adjacent frames in the video stream;

determining a maximum pair of adjacent frames corresponding to a maximum value among the calculated average motion vector magnitudes; and generating a new frame by performing motion compensation to each of the frames of the maximum pair of adjacent frames; and forming a new video stream of sequential frames by inserting the new frame between the frames of the maximum pair of adjacent frames, wherein the new video stream has a second frame rate.

12. The method of claim 11, further comprising:
shifting the sequential frames of the new video stream such that the frames are evenly spaced.

13. The method of claim 11, wherein the generating the new frame comprises:
compensating one of the maximum pair of the adjacent frames by a motion vector scaled by a predetermined amount toward the other of the maximum pair of the adjacent frames; and
compensating the other of the maximum pair of the adjacent frames by the scaled motion vector toward the one of the maximum pair of the adjacent frames.

14. The method of claim 13, wherein the predetermined amount of the scaled motion vector is ½.

* * * * *